United States Patent
Yang

(10) Patent No.: US 11,356,913 B2
(45) Date of Patent: Jun. 7, 2022

(54) MEASUREMENT METHOD OF NON-CONNECTED STATE USER-SIDE DEVICE, MEASUREMENT APPARATUS OF NON-CONNECTED STATE USER-SIDE DEVICE AND USER-SIDE DEVICE

(71) Applicant: VIVO MOBILE COMMUNICATION CO., LTD., Guangdong (CN)

(72) Inventor: Xiaodong Yang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 58 days.

(21) Appl. No.: 16/765,048

(22) PCT Filed: Oct. 10, 2018

(86) PCT No.: PCT/CN2018/109684
§ 371 (c)(1),
(2) Date: May 18, 2020

(87) PCT Pub. No.: WO2019/095895
PCT Pub. Date: May 23, 2019

(65) Prior Publication Data
US 2020/0329409 A1   Oct. 15, 2020

(30) Foreign Application Priority Data
Nov. 16, 2017   (CN) .......................... 201711139513.0

(51) Int. Cl.
*H04W 36/00* (2009.01)
*H04W 88/02* (2009.01)

(52) U.S. Cl.
CPC ... *H04W 36/0094* (2013.01); *H04W 36/0088* (2013.01); *H04W 88/02* (2013.01)

(58) Field of Classification Search
CPC ......... H04W 36/0094; H04W 36/0088; H04W 88/02; H04W 76/27; H04W 24/10; H04W 24/02
See application file for complete search history.

(56) References Cited

U.S. PATENT DOCUMENTS

2012/0076041 A1* 3/2012 Jung ..................... H04W 24/10
                                                    370/252
2012/0302240 A1   11/2012 Tamaki et al.
(Continued)

FOREIGN PATENT DOCUMENTS

CN   102448107 A   5/2012
CN   102469498 A   5/2012
(Continued)

OTHER PUBLICATIONS

International Report on Patentability and Written Opinion dated Dec. 28, 2018 issued in PCT/CN2018/109684.
(Continued)

*Primary Examiner* — Pao Sinkantarakorn
*Assistant Examiner* — Kabir U Jahangir
(74) *Attorney, Agent, or Firm* — Brooks Kushman P.C.

(57) ABSTRACT

A measurement method of a non-connected state user-side device, a measurement method of a non-connected state user-side device and a user-side device are provided. The method includes: acquiring, by the user-side device, non-connected state measurement configuration information; performing, by the user-side device, a non-connected state measurement according to the non-connected state measurement configuration information. According to the present disclosure, based on the non-connected state measurement configuration information, the user-side device may help the network-side device to select a suitable user-side device to perform the non-connected state measurement, thereby achieving the measurement of the non-connected state user- (Continued)

side device. In addition, the non-connected state measurement configuration information may include inter-frequency measurement configuration information, thereby achieving an inter-frequency measurement and saving resources of the user-side device during the measurement.

17 Claims, 8 Drawing Sheets

(56) References Cited

U.S. PATENT DOCUMENTS

| | | | |
|---|---|---|---|
| 2012/0309404 | A1 | 12/2012 | Suzuki et al. |
| 2013/0070632 | A1 | 3/2013 | Jung et al. |
| 2013/0208617 | A1 | 8/2013 | Fukuta |
| 2013/0215736 | A1 | 8/2013 | Han et al. |
| 2015/0139053 | A1 | 5/2015 | Van Lieshout et al. |
| 2015/0326366 | A1 | 11/2015 | Li et al. |
| 2017/0055202 | A1* | 2/2017 | Uchiyama ......... H04W 52/0209 |
| 2018/0109982 | A1 | 4/2018 | Zheng et al. |
| 2018/0227972 | A1* | 8/2018 | Tsuboi .................. H04W 92/18 |
| 2019/0037425 | A1* | 1/2019 | Hong .................. H04W 72/042 |
| 2021/0051536 | A1* | 2/2021 | Yang ..................... H04W 24/08 |

FOREIGN PATENT DOCUMENTS

| | | |
|---|---|---|
| CN | 102685798 A | 9/2012 |
| CN | 102860062 A | 1/2013 |
| CN | 103155620 A | 6/2013 |
| CN | 104170437 A | 11/2014 |
| CN | 106941677 A | 7/2017 |
| WO | 2014113958 A1 | 7/2014 |
| WO | 2016197378 A1 | 12/2016 |

OTHER PUBLICATIONS

European Search Report dated Oct. 22, 2020 issued in PCT/CN2018/109684.
3GPP TSG-RAN WG2 #99, Prague, Czech Republic Oct. 9-13, 2017, R2-1711138, 3 pages.
Office Action dated Feb. 6, 2020 issued in Chinese Application No. 201711139513.0.

* cited by examiner

MEASUREMENT METHOD OF NON-CONNECTED STATE USER-SIDE DEVICE, MEASUREMENT APPARATUS OF NON-CONNECTED STATE USER-SIDE DEVICE AND USER-SIDE DEVICE

CROSS REFERENCE OF RELATED APPLICATION

The present application is the U.S. national phase of PCT Application PCT/CN2018/109684 file on Oct. 10, 2018, which claims a priority of Chinese patent application program No. 201711139513.0 filed on Nov. 16, 2017, which is incorporated herein by reference in its entirety.

TECHNICAL FIELD

The present disclosure relates to the field of communication technologies, and in particular, to a measurement method of a non-connected state user-side device, a measurement method of a non-connected state user-side device and a user-side device.

BACKGROUND

With the continuous development of communication technology, in order to meet the requirements of single user peak rate and system capacity improvement, the direct solution may be to increase the system transmission bandwidth. To this end, a technology that can increase the system transmission bandwidth is proposed, that is, carrier aggregation technology.

The carrier aggregation technology is a technology in which a user-side device connects and communicates through multiple cells and a network, where the multiple cells may include a primary cell (Pcell) and at least one secondary cell (that is, cells except the primary cell), where the primary cell is not in the deactivated state, and remains activated all the time, and the secondary cell exists the activated state and the deactivated state. Since there are two different states of the secondary cell, in some cases, the secondary cell needs to be quickly activated. In order to activate the secondary cell, it is needed to measure the non-connected user-side device. Generally, when the user-side device is in the connected state, the user-side device can be notified to perform the non-connected state measurement by using a dedicated signaling, or instruct the user-side device to perform the non-connected state measurement through the indication information in the system broadcast message.

However, the current non-connected user-side equipment does not have non-connected measurement configuration information (especially inter-frequency measurement configuration). The user-side equipment performs the inter-frequency measurement only when it needs to trigger cell reselection. In addition, if the user-side device frequently performs measurements in the non-connected state, a lot of resources of the user-side device will be consumed, such as the power resource of the user-side device.

SUMMARY

The present disclosure is to provide a measurement method of a non-connected state user-side device, a measurement method of a non-connected state user-side device and a user-side device, to achieve a measurement of a non-connected state user-side device including an inter-frequency measurement and save the resources of the user-side device.

In a first aspect, a measurement method of a non-connected state user-side device is provided in the present disclosure, including:

acquiring, by the user-side device, non-connected state measurement configuration information;

performing, by the user-side device, a non-connected state measurement according to the non-connected state measurement configuration information.

In a second aspect, a measurement method of a non-connected state user-side device is provided in the present disclosure, including:

acquiring, by the user-side device, non-connected state measurement preference information or capability information;

indicating to a network-side device, by the user-side device, whether the user-side device is capable of performing a non-connected state measurement or whether the user-side device expects to perform a non-connected state measurement.

In a third aspect, a measurement apparatus of a non-connected state user-side device is provided in the present disclosure, including:

a configuration information acquiring module, configured to acquire non-connected state measurement configuration information;

a measuring module, configured to perform a non-connected state measurement according to the non-connected state measurement configuration information.

In a fourth aspect, a measurement apparatus of a non-connected state user-side device is provided in the present disclosure, including:

a preference acquiring module, configured to acquire non-connected state measurement preference information or capability information;

an indicating module, configured to indicate to a network-side device whether the user-side device is capable of performing a non-connected state measurement or whether the user-side device expects to perform a non-connected state measurement.

In a fifth aspect, a user-side device is provided in the present disclosure, including: a memory, a processor and a computer program stored in the memory and executable on the processor, and the computer program is executed by the processor to perform the measurement method of the first or the second aspect.

In a sixth aspect, a computer-readable storage medium storing a computer program is provided in the present disclosure, where the computer program is executed by a processor to perform the measurement method of the first or the second aspect.

According to the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

BRIEF DESCRIPTION OF THE DRAWINGS

In order to illustrate the technical solution of the embodiments of the present disclosure more clearly, the drawings used in the description of the embodiments of the present disclosure will be briefly described below. Obviously, the drawings in the following description are merely some embodiments of the present disclosure. For those of ordinary skill in the art, other drawings may be obtained based on these drawings without creative work.

DETAILED DESCRIPTION

A measurement method of a non-connected state user-side device, a measurement method of a non-connected state user-side device and a user-side device are provided in the embodiments of the present disclosure.

In order to enable those skilled in the art to better understand the technical solutions in the present disclosure, the technical solutions in the embodiments of the present disclosure will be described clearly and completely in conjunction with the drawings in the embodiments of the present disclosure. Obviously, the described embodiments are only a part of the embodiments of the present disclosure, but not all the embodiments. Based on the embodiments in the present disclosure, all other embodiments obtained by those of ordinary skill in the art without creative work shall fall within the scope of the present disclosure.

The technical solution of the present disclosure can be applied to various communication systems, for example: Global System of Mobile (GSM) communication, Code Division Multiple Access (CDMA) system, Wideband Code Division Multiple Access (WCDMA), General Packet Radio Service (GPRS), Long Term Evolution (LTE), etc.

User equipment (UE), also known as Mobile Terminal) access terminal, subscriber unit, user station, mobile station, mobile station, remote station, remote terminal, mobile device, user terminal, Terminal, wireless communication device, user agent or user device. The access terminal can be a cellular phone, a cordless phone, a Session Initiation Protocol (SIP) phone, a Wireless Local Loop (WLL) station, a Personal Digital Assistant (PDA), or a wireless communication function handheld devices, computing devices or other processing devices connected to wireless modems, in-vehicle devices, wearable devices, terminal devices in future 5G networks or terminals in future evolved Public Land Mobile Network (PLMN) networks device.

The network-side device may be a device for communicating with a mobile device, and the network-side device may be a Base Transceiver Station (BTS) in Global System of Mobile communication (GSM) or Code Division Multiple Access (CDMA), or NodeB (NB) base station in WCDMA, or eNB or eNodeB (Evolutional Node B, in Long Term Evolution) or access point, or vehicle-mounted device, wearable device, network side device in the future 5G network or network side device in the future evolved PLMN network.

The system to which the present disclosure is applicable may be a Frequency Division Duplex (FDD) system, a Time Division Duplex (TDD) system, or a system in which FDD and TDD are combined in duplex mode, but the present disclosure is not limited herein.

Embodiment 1

Figure 1:
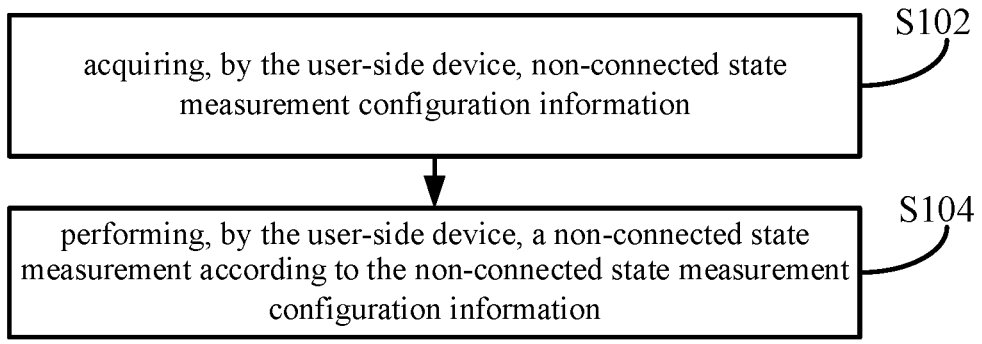
FIG. 1 is an embodiment of a measurement method of a non-connected user-side device of the present disclosure.

As shown in FIG. 1, a measurement method of a non-connected user-side device is provided in an embodiment of the present disclosure. This method can be applied to the measurement of a non-connected user-side device. The measurement of the non-connected user-side device may be a measurement that needs to be performed by the user-side device when it is in the non-connected state. The measurement of the non-connected user-side device may be set according to different measurement purposes, for example, the purpose of the measurement of the non-connected user-side device is to quickly activate the secondary cell (SCell). Correspondingly, the measurement item may be the measurement of the signal quality of the reference signal at different frequencies (not only the frequency of the current cell, but also the frequencies of other cells, etc.). The purpose of the measurement and the measurement items may be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S102: acquiring, by the user-side device, non-connected state measurement configuration information.

In the communication network, the user-side device may be in two states, one is connected state, and the other is non-connected state, where the non-connected state may also include an idle state and an inactive state. When the user-side device is in the connected state, the user-side device may establish a communication connection with the network-side device. At this time, the user-side device may send information to the network-side device, and the network-side device may also send information to the user-side device. When the user-side device is in a non-connected state, the communication connection between the user-side device and the network-side device is disconnected, and at this time, the user-side device is in an idle state. The network-side device may be a wireless device that transmits information to the user-side device in a certain radio coverage area. The network-side device may include one device, such as a base station, or the network-side device may also include multiple devices. For example, in addition to the base station, the network-side device may also include a key control node MME and/or a serving gateway device.

In the implementation, with the continuous development of communication technology, in order to meet the requirements of single user peak rate and system capacity improvement, the direct solution may be to increase the system transmission bandwidth. To this end, a technology that can increase the system transmission bandwidth is proposed. It is the carrier aggregation technology. The carrier aggregation technology is a technology in which a user-side device connects and communicates through multiple cells and a network, where multiple cells may include a primary cell (Pcell) and at least one secondary cell (that is, multiple cells except the primary cell), where the primary cell does not have the deactivated state and remains activated all the time, and the secondary cell has the activated state and the deactivated state. Since the secondary cell has two different states, in some cases, it is necessary to quickly activate the secondary cell. In order to activate the secondary cell, it is necessary to measure the non-connected user-side device. According to the measurement method of the non-connected user-side device in the embodiments of the present disclosure, it is able to achieve the measuring of the non-connected user-side device. For details, reference may be made to the following description.

The processing of acquiring the non-connected measurement configuration information by the user-side device may be that the user-side device acquires the non-connected measurement configuration information when it is in the connected state, or the user-side device acquires the non-connected measurement configuration information when it is in the non-connected state. In order to better explain the specific processing procedure of the embodiment of the present disclosure, in this embodiment, a specific processing method is used to obtain the non-connected state measurement configuration information. For details, reference may be made to the following description.

In order to select an appropriate user-side device for the measurement of the non-connected user-side device, the user-side device may be preselected as the device for performing the non-connected state measurement, and the user-side device may actively instruct itself to be the user-side device for the non-connected state measurement. At this time, the user-side device may set the non-connected measurement configuration information according to the actual situation of the current communication network. The non-connected measurement configuration information may include the intra-frequency measurement configuration information, or may include the inter-frequency measurement configuration information. Specifically, for example, a signal quality of the reference signal of cell 1 at measurement frequency 1, a signal quality of the reference signal of cell 3 at measurement frequency 1, a signal quality of the reference signal of cell 1 at measurement frequency 2, and a signal quality of the reference signal of cell 5 at measurement frequency, etc. After setting the above non-connected state measurement configuration information, the user-side device may store it in a designated storage area of the user-side device. When the user-side device changes switches a connected state to a non-connected state (that is, an idle state or an inactive state), the user-side device may find from its designated storage area whether it contains non-connected measurement configuration information. If it contains non-connected measurement configuration information, the non-connected state measurement configuration information can be extracted, so that the user-side device may obtain the non-connected state measurement configuration information. If the configuration information of the non-connected state measurement is not included, it is indicated that the user-side device is not a non-connected state measurement device, and the user-side device may not perform any operation.

In addition, the processing of acquiring the non-connected measurement configuration information by the user-side device in step S102 may be performed in various ways, and an optional processing method is provided below, that is, whether the non-connected measurement is performed can be determined in a pre-agreed manner, Specifically, it may include the following: the user-side device obtains preset non-connected state measurement agreement information; if the non-connected state measurement agreement information instructs the user-side device to perform non-connected state measurement, the user-side device generates non-connected measurement configuration information according to the non-connected state measurement agreement information.

S104: performing, by the user-side device, a non-connected state measurement according to the non-connected state measurement configuration information.

The non-connected state measurement may be a measurement operation that needs to be performed when the user-side device is in the non-connected state.

In an implementation, after obtaining the non-connected state measurement configuration information through the process of step S102, the user-side device may analyze and extract related content in the non-connected state measurement configuration information, and based on the related content of the non-connected state measurement configuration information, the user-side device perform the measurement configuration in the non-connected state for the user-side device. That is, based on the example of step S102 above, information such as the signal quality of the reference signal at which frequencies need to be measured is written into the items to be completed or to be executed by the user-side device, for example, by measuring the signal quality of the reference signal of cell 1 at frequency 1, the signal quality of the reference signal of cell 3 at measurement frequency 1, the signal quality of the reference signal of cell 1 at measurement frequency 2, the signal quality of the reference signal of cell 5 at measurement frequency 3, etc. The information is written into the item to be completed or to be executed by the user-side device. After the configuration is completed, the user-side device may perform non-connected state measurement one by one according to the items to be completed or to be executed, and obtain corresponding measurement results.

Figure 2:
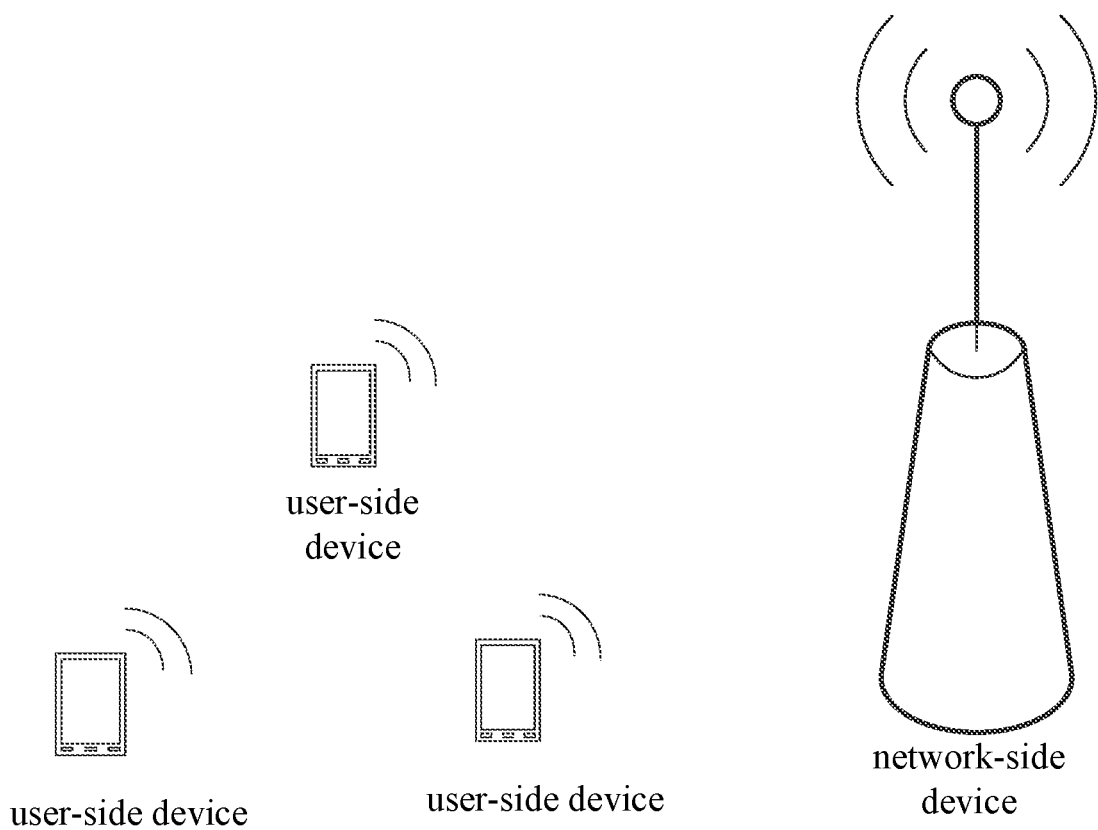
FIG. 2 is a schematic structural diagram of a communication network of the present disclosure.

As shown in FIG. 2, when the user-side device changes from a non-connected state to a connected state, the user-side device may send the current measurement result to the network-side device using indication information that can be used. After the network-side device receives the indication information, a notification message for reporting the measurement result may be sent to the user-side device, and after receiving the notification message, the user-side device may send the measurement result to the network-side device. After receiving the measurement result, the network-side device may use the measurement result to configure the secondary cell and activate the secondary cell. If the secondary cell is successfully activated, the user-side device may use the secondary cell to send and receive data with the network-side device.

It should be noted that not all user-side devices need to perform the non-connected state measurement after acquiring the configuration information of the non-connected state. In actual applications, the user-side device can determine whether to perform the non-connected state measurement according to the current actual situation. In connection state measurement, if the user-side device determines that it cannot perform non-connection state measurement, it may send a notification message to the network side device to refuse to perform the non-connection state measurement.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

The above first embodiment (that is, the specific processing procedures of the above steps S102 and S104) is not limited to one of the achievable methods provided above, and the non-connected state measurement can also be implemented in various ways. The following provides 6 optional processing methods. For details, reference may be made to the details in Embodiment 2, Embodiment 3, Embodiment 4, Embodiment 5, Embodiment 6, Embodiment 7 and Embodiment 8 respectively.

Embodiment 2

Figure 3:
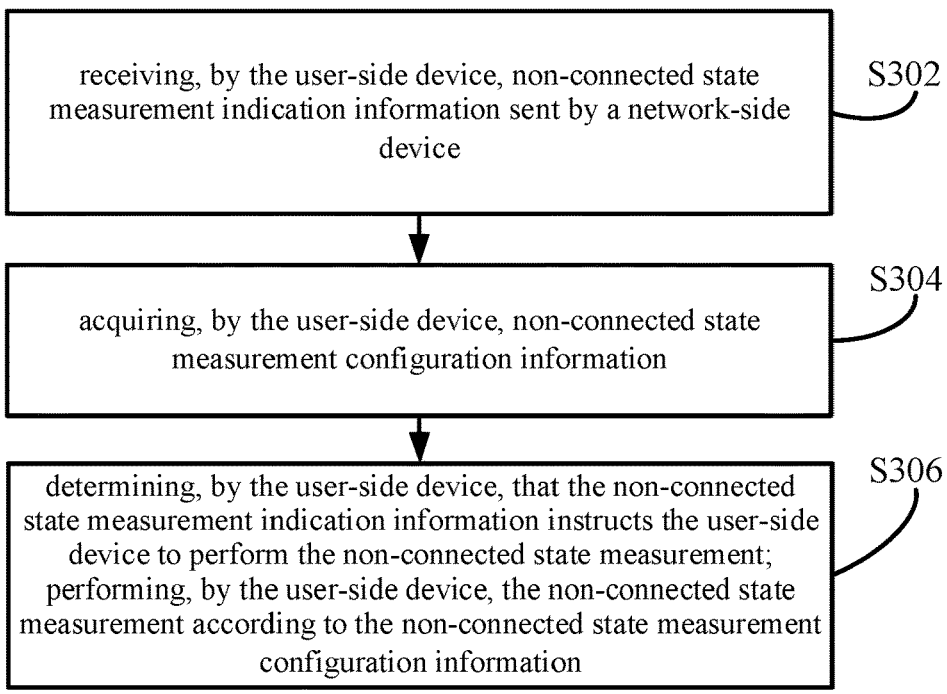
FIG. 3 is another embodiment of a measurement method of a non-connected user-side device of the present disclosure.

As shown in FIG. 3, a measurement method for a non-connected user-side device is provided in an embodiment of the present disclosure. The method can be applied to a process of measuring a non-connected user-side device. The measurement of the non-connected user-side device may be a measurement that needs to be performed by the user-side device when it is in the non-connected state. The measurement of the non-connected user-side device may be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items may be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The network-side device mentioned in the embodiments of the present disclosure may be a wireless device that transmits information with a user-side device in a certain radio coverage area. The network-side device may include a device, such as a base station, the network-side device. It may also include multiple devices. For example, the network-side device may include a key control node MME and/or a serving gateway device in addition to the base station. The method may specifically include the following steps:

S302: receiving, by the user-side device, non-connected state measurement indication information sent by a network-side device, where the non-connected state measurement indication information includes the non-connected state measurement configuration information.

The non-connected state measurement indication information may be information for indicating whether the user-side device performs the non-connected state measurement. If the non-connected state measurement indication information includes information instructing the user-side device to perform the non-connected state measurement, the non-connected state measurement indication information may include the non-connected state measurement configuration information. If the non-connected state measurement indication information does not include the information instructing the user-side device to perform the non-connected state measurement, the non-connected state measurement indication information does not include the non-connected state measurement configuration information.

In the implementation, when the user-side device is in a connected state, at this time, the user-side device and the network-side device can perform data interaction through the communication network, and the network-side device may select the appropriate user-side device from the user-side devices having a communication connection with the device according to the actual situation of the current communication network, for example, select the user-side device that is in the connected state and has high data processing capability. After the selection is completed, the network-side device may generate the non-connected state measurement indication information, and may send the non-connected state measurement indication information to the corresponding user-side device through the communication network. In practical applications, the network-side device may send the non-connected state measurement indication information to the user-side device in various ways. The following provides various optional processing methods, which may specifically include: the non-connected state measurement indication information, It is sent to the user-side device through broadcast or proprietary signaling such as Radio Resource Control (RRC), MAC Control Element (MAC CE) or Physical Downlink Control Channel (PDCCH), for example, System Information Block 5 (SIB5) can carry the above non-connected state measurement indication information, and then the network side device may send the SIB5 carrying the non-connected state measurement indication information to the corresponding user-side device by broadcasting. The user-side device may receive the non-connected state measurement indication information sent by the network side device.

When the user-side device changes from the connected state to the non-connected state, step S304 and step S306 described below may be performed.

S304: acquiring, by the user-side device, non-connected state measurement configuration information.

The content of the step S304 is the same as the content of the step S102 in the embodiment 1, and the specific processing of the step S304 can be referred to the related content of the step S102, which will not be repeated here.

S306: determining, by the user-side device, that the non-connected state measurement indication information instructs the user-side device to perform the non-connected state measurement; performing, by the user-side device, the non-connected state measurement according to the non-connected state measurement configuration information.

In the implementation, the user-side device may specifically determine whether to perform the non-connected state measurement according to the indication information provided in the non-connected state measurement indication information. If the above-mentioned indication information does not exist in the user-side device, the user-side device may not need to perform the non-connected state measurement. If the non-connected state measurement indication information instructs the user-side device to perform the non-connected state measurement, the user-side device may extract the non-connected state measurement configuration information from the non-connected state measurement indication information through the above step S304, and the user-side device may perform the non-connected state measurement based on the extracted non-connected state measurement configuration information, and obtain the corresponding measurement result. The network side device may quickly activate the secondary cell based on the measurement result. For the corresponding processing procedure, reference may be made to the relevant content of step S104 in Embodiment 1 above, which is not repeated herein.

In addition, considering that the communication quality or available bandwidth of the communication network is different at different moments, in order to make the measurement results more efficient, a valid time may be set for the above-mentioned non-connected state measurement indication information, then the specific processing of step S306 may be implemented in the following manner: when the non-connected state measurement indication information instructs the user-side device to perform the non-connected state measurement, and the duration from the receiving time of the non-connected state measurement indication information to the current time is within a predetermined duration range, the user-side device performs the non-connected measurement based on the non-connected measurement configuration information.

The predetermined duration range may be set according to the actual situation, for example, the predetermined time range is 0 to 10 minutes or 0 to 5 minutes.

In the implementation, if the non-connected state measurement indication information instructs the user-side device to perform the non-connected state measurement, the user-side device may calculate the elapsed time from the receiving time of the non-connected state measurement indication information to the current time, and then the obtained duration is compared with the predetermined duration range. If the obtained duration is not within the predetermined duration range, it is indicated that the non-connected state measurement indication information is invalid. At this time, the user-side device may not need to perform the non-connected state measurement. If the obtained duration is within a predetermined duration, it is indicated that the non-connected state measurement indication information is valid. At this time, the user-side device may perform the non-connected state measurement. For the specific processing procedure of performing the non-connected state measurement, reference may be made to the steps in Embodiment 1 above. The relevant content of S104 will not be repeated here.

It should be noted that not all user-side devices that receive the non-connected state measurement indication information for performing non-connected state measurement require or must perform non-connected state measurement. In actual applications, the user-side device can be based on the current location. The actual situation determines whether to perform the non-connected state measurement. If the user-side device determines that it cannot perform the non-connected state measurement, it may send a notification message to the network side device to refuse to perform the non-connected state measurement.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 3

Figure 4:
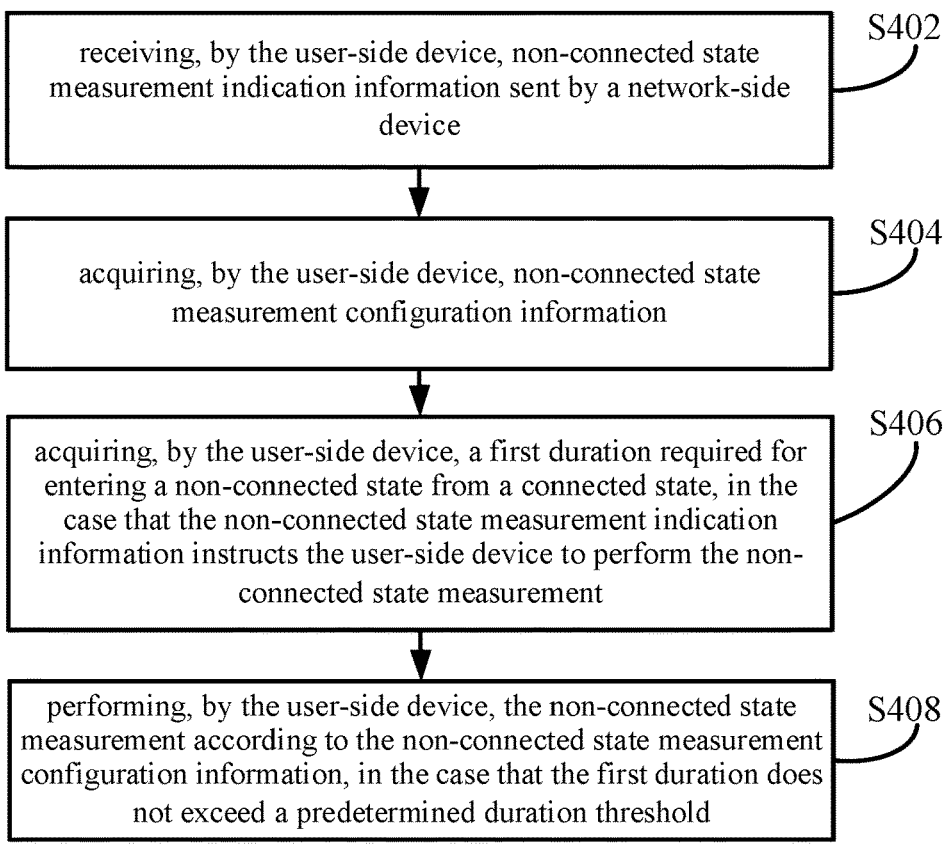
FIG. 4 is another embodiment of a measurement method of a non-connected user-side device of the present disclosure.

As shown in FIG. 4, a measurement method of a non-connected user-side device is provided in an embodiment of the present disclosure provides. The method can be applied to the measurement of a non-connected user-side device. The measurement of the non-connected user-side device is a measurement that needs to be performed by the user-side device when it is in the non-connected state. The measurement of the non-connected user-side device can be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items can be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S402: receiving, by the user-side device, non-connected state measurement indication information sent by a network-side device.

The content of the step S402 is the same as the content of the step S302 in the second embodiment, and the specific processing of the step S402 may be referred to the related content of the step S302, which will not be repeated here.

S404: acquiring, by the user-side device, non-connected state measurement configuration information.

The content of the step S404 is the same as the content of the step S102 in the first embodiment, and the specific processing of the step S404 may be referred to the related content of the step S102, which will not be repeated here.

The time required for the user-side device to enter the non-connected state from the connected state may reflect the data processing performance of the user-side device to a certain extent. Therefore, the selecting conditions of the user-side device for non-connected state measurement may be set accordingly.

S406: acquiring, by the user-side device, a first duration for entering a non-connected state from a connected state, in the case that the non-connected state measurement indication information instructs the user-side device to perform the non-connected state measurement.

The first duration may be the duration for the user-side device to enter the non-connected state from the connected state, e.g., 1 millisecond or 1 second.

S408: performing, by the user-side device, the non-connected state measurement according to the non-connected state measurement configuration information, in the case that the first duration does not exceed a predetermined duration threshold.

The duration threshold may be set according to actual conditions, such as 1 second or 100 milliseconds.

For the specific processing of step S408, reference may be made to the related content of step S104, and details are not described herein again.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 4

Figure 5:
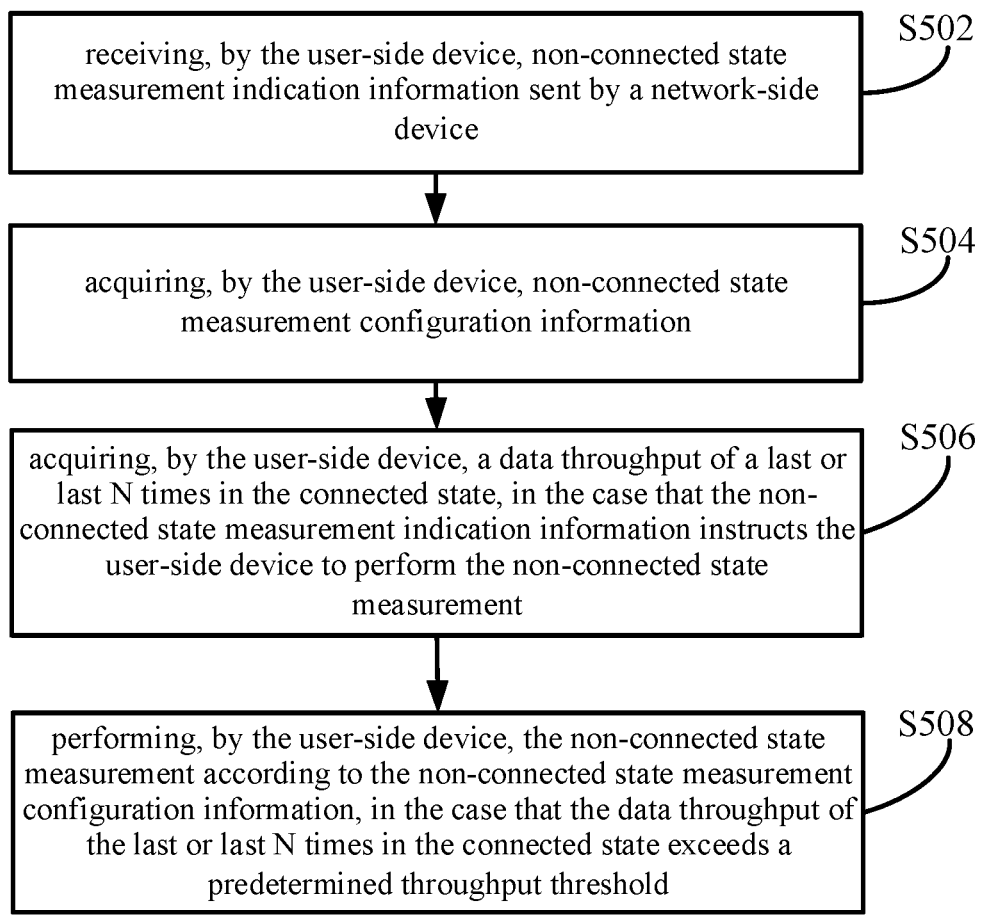
FIG. 5 is another embodiment of a measurement method of a non-connected user-side device of the present disclosure.

As shown in FIG. 5, a measurement method of a non-connected user-side device is provided in an embodiment of the present disclosure. The method can be applied to the measurement of a non-connected user-side device. The measurement of the non-connected user-side device is a measurement that needs to be performed by the user-side device when it is in the non-connected state. The measurement of the non-connected user-side device can be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items can be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S502: receiving, by the user-side device, non-connected state measurement indication information sent by a network-side device.

The content of the step S502 is the same as the content of the step S302 in the second embodiment, and the specific processing of the step S502 can refer to the related content of the step S302, which will not be repeated here.

S504: acquiring, by the user-side device, non-connected state measurement configuration information.

The content of the step S504 is the same as the content of the step S102 in the first embodiment, and the specific processing of the step S504 can refer to the related content of the step S102, which will not be repeated here.

The data throughput of the user-side device in the connected state may reflect the data processing performance of the user-side device to a certain extent. Therefore, the selection conditions of the user-side device for non-connected state measurement may be set accordingly.

S506: acquiring, by the user-side device, a data throughput of a last or last N times in the connected state, in the case that the non-connected state measurement indication information instructs the user-side device to perform the non-connected state measurement.

The data throughput may be the amount of data received and sent when the user-side device is in the connected state, such as 10 GB or 100 GB. N is a positive integer greater than 1.

S508: performing, by the user-side device, the non-connected state measurement according to the non-connected state measurement configuration information, in the case that the data throughput of the last or last N times in the connected state exceeds a predetermined throughput threshold, where N is a positive integer larger than 1.

The throughput threshold may be set according to the actual situation, such as 10 GB or 1 GB.

For the specific processing of step S508, reference may be made to the related content of step S104, and details are not described herein again.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 5

Figure 6:
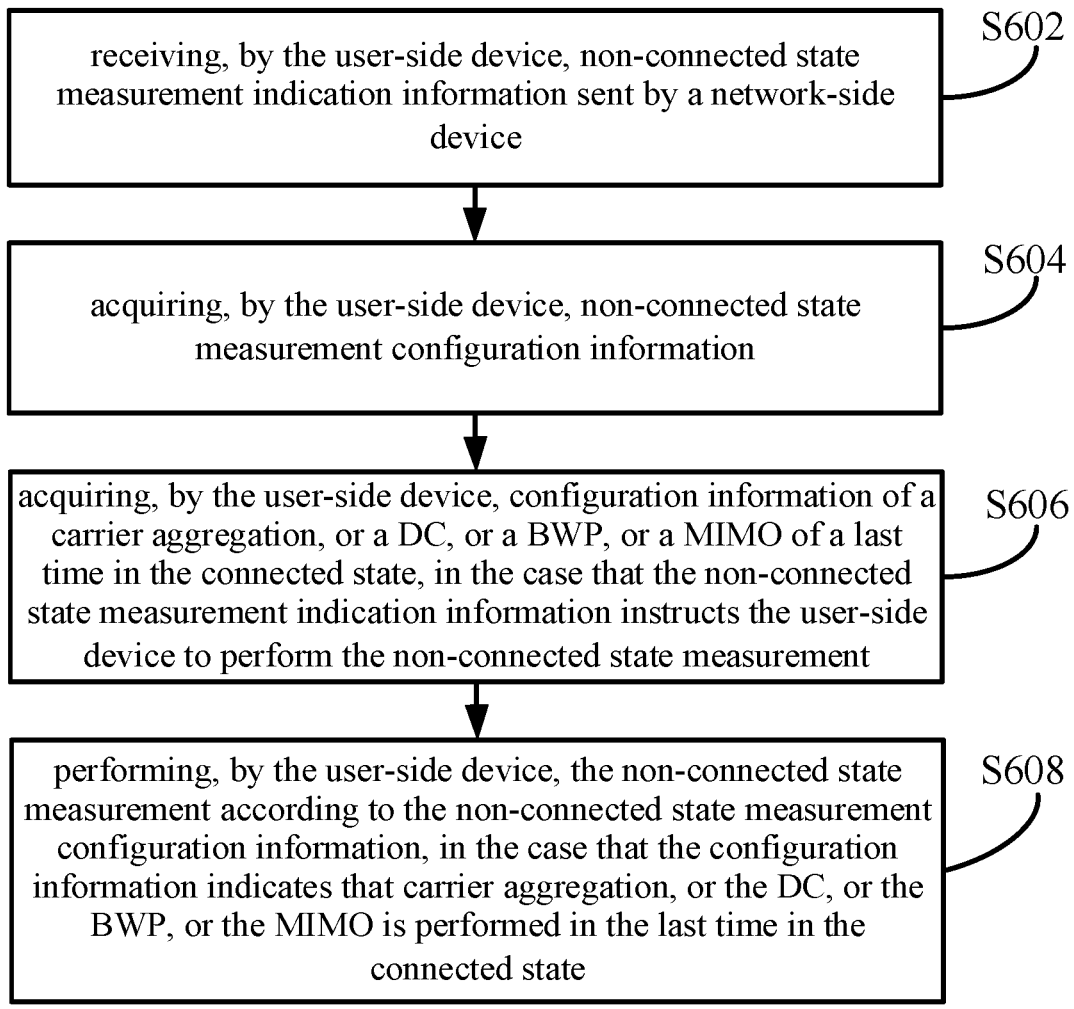
FIG. 6 is another embodiment of a measurement method of a non-connected user-side device of the present disclosure.

As shown in FIG. 6, a measurement method of a non-connected user-side device is provided in an embodiment of the present disclosure provides. The method can be applied to the measurement of a non-connected user-side device. The measurement of the non-connected user-side device is a measurement that needs to be performed by the user-side device when it is in the non-connected state. The measurement of the non-connected user-side device can be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items can be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S602: receiving, by the user-side device, non-connected state measurement indication information sent by a network-side device.

The content of the step S602 is the same as the content of the step S302 in the second embodiment, and the specific processing of the step S602 can refer to the related content of the step S302, which will not be repeated here.

S604: acquiring, by the user-side device, non-connected state measurement configuration information.

The content of the step S604 is the same as the content of the step S102 in the first embodiment, and the specific processing of the step S604 can be referred to the related content of the step S102, which will not be repeated here.

In consideration of that whether the carrier aggregation or dual connection DC was performed last time when the user-side device was in the connected state, or the bandwidth part of the BWP, or multi-input multi-output MIMO may reflect the data processing performance of the user-side device to a certain extent, the selecting conditions of the user-side device for non-connected state measurement may be set accordingly.

S606: acquiring, by the user-side device, configuration information of a carrier aggregation, or a dual connection (DC), or a bandwidth part (BWP), or a multiple input multiple output (MIMO) of a last time in the connected state, in the case that the non-connected state measurement indication information instructs the user-side device to perform the non-connected state measurement.

The configuration information of the carrier aggregation may be information indicating whether the user-side device was configured in the form of Carrier Aggregation (CA) or DC when the user-side device was in the connected state last time.

S608: performing, by the user-side device, the non-connected state measurement according to the non-connected state measurement configuration information, in the case that the configuration information indicates that carrier aggregation, or the DC, or the BWP, or the MIMO is performed in the last time in the connected state.

For the specific processing of step S608, reference may be made to the related content of step S104, and details are not described herein again.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 6

Figure 7:
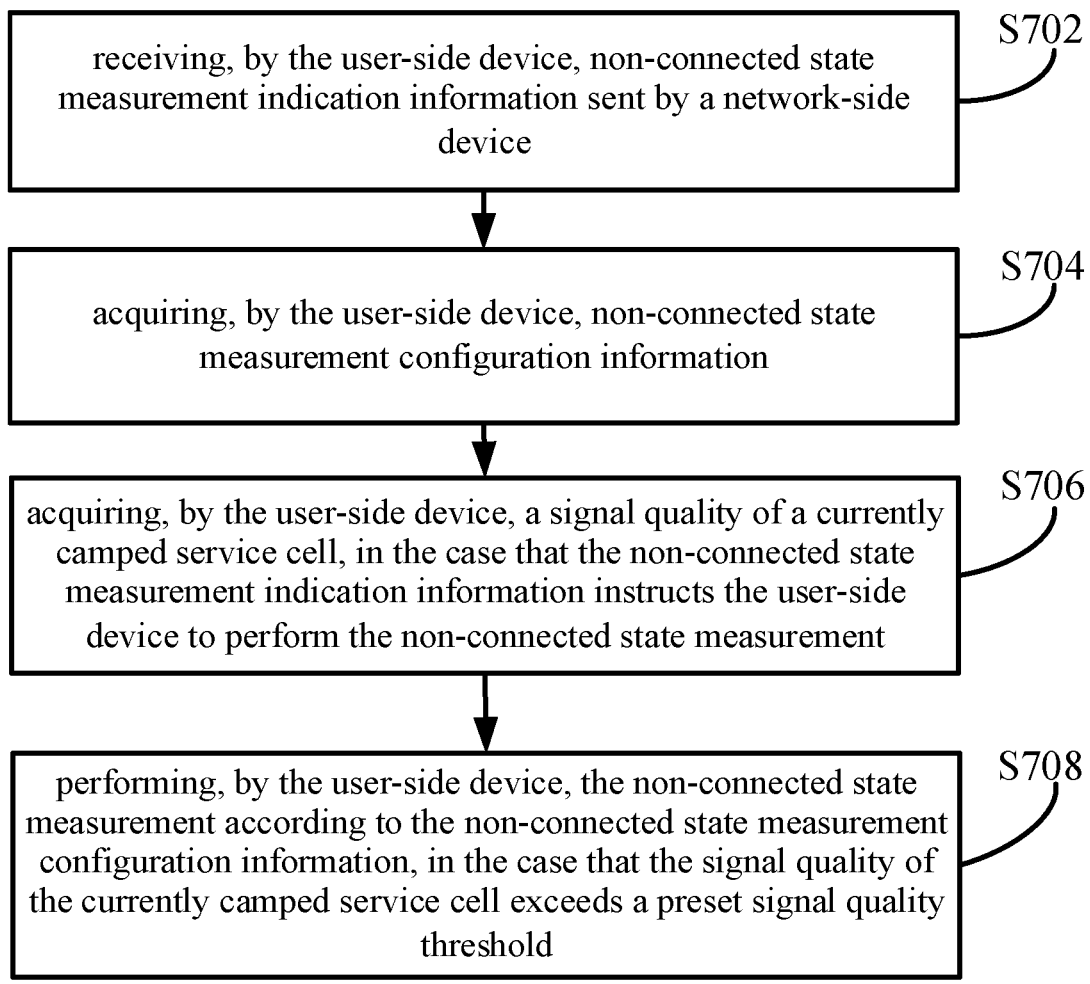
FIG. 7 is another embodiment of a measurement method of a non-connected user-side device of the present disclosure.

As shown in FIG. 7, a measurement method of a non-connected user-side device is provided in an embodiment of the present disclosure provides. The method can be applied to the measurement of a non-connected user-side device. The measurement of the non-connected user-side device is a measurement that needs to be performed by the user-side device when it is in the non-connected state. The measurement of the non-connected user-side device can be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items can be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S702: receiving, by the user-side device, non-connected state measurement indication information sent by a network-side device.

The content of the step S702 is the same as the content of the step S302 in the second embodiment, and the specific processing of the step S702 can be referred to the related content of the step S302, which will not be repeated here.

S704: acquiring, by the user-side device, non-connected state measurement configuration information.

The content of the step S704 is the same as the content of the step S102 in the first embodiment, and the specific processing of the step S704 can be referred to the related content of the step S102, which will not be repeated here.

In consideration of that the signal quality of the serving cell where the user-side device currently camps may reflect the data processing performance of the user-side device to a certain extent, the selecting conditions of the user-side device for non-connected state measurement may be set accordingly.

S706: acquiring, by the user-side device, a signal quality of a currently camped service cell, in the case that the non-connected state measurement indication information instructs the user-side device to perform the non-connected state measurement.

The signal quality of the serving cell is a serving cell RSRP.

S708: performing, by the user-side device, the non-connected state measurement according to the non-connected state measurement configuration information, in the case that the signal quality of the currently camped service cell exceeds a preset signal quality threshold.

The signal quality threshold may be set according to actual conditions, which is not limited in the embodiments of the present disclosure.

For the specific processing of step S708, reference may be made to the related content of step S104, and details are not described herein again.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 7

Figure 8:
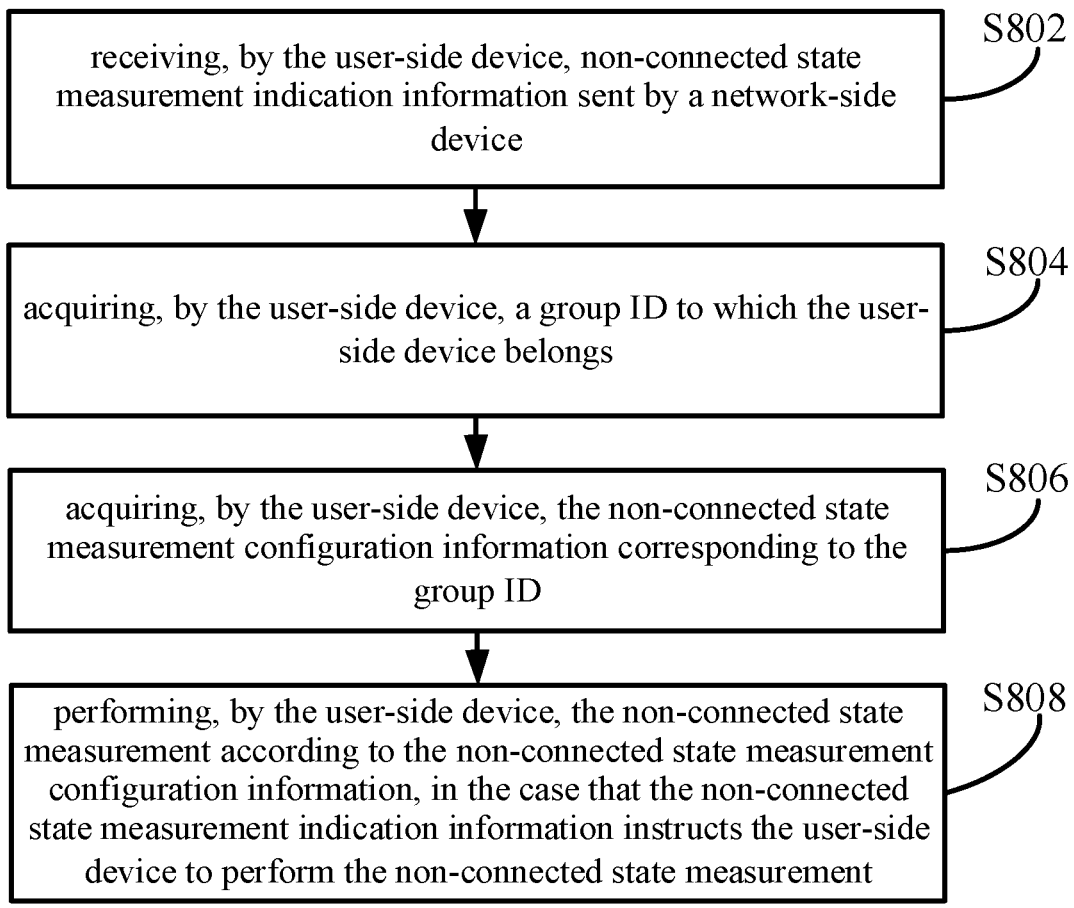
FIG. 8 is another embodiment of a measurement method of a non-connected user-side device of the present disclosure.

As shown in FIG. 8, a measurement method of a non-connected user-side device is provided in an embodiment of the present disclosure provides. The method can be applied to the measurement of a non-connected user-side device. The measurement of the non-connected user-side device is a measurement that needs to be performed by the user-side device when it is in the non-connected state. The measurement of the non-connected user-side device can be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items can be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S802: receiving, by the user-side device, non-connected state measurement indication information sent by a network-side device.

The content of the step S802 is the same as the content of the step S302 in the second embodiment. For the specific processing of the step S802, reference may be made to the related content of the step S302, which will not be repeated here.

S804: acquiring, by the user-side device, a group ID to which the user-side device belongs.

The group ID may be information used to mark user-side devices that need to be measured in a non-connected state, such as the packet name or number.

In implementation, when the user-side device is in the connected state, the network-side device may send or broadcast the relevant group ID of the user-side device for non-connected state measurement to the user-side device through SIB5 or PDCCH. After receiving the group ID, the user-side device may calculate the group ID to which the user-side device belongs based on a preset rule or algorithm, and then may compare the calculated group ID with the received group ID. If the group ID is included in the received group ID, the processes from step S806 to step S808 described below can be performed. If the calculated group ID is not included in the received group ID, it is not necessary to perform non-connected state measurement.

It should be noted that the acquisition of the group ID to which the user-side device belongs may be obtained based on a preset rule or algorithm, or may be obtained in the following manner, that is, the user-side device acquires the group ID which is allocated by the network-side device for the user-side device.

In the implementation, the network-side device may calculate a group ID for the user-side device that needs to perform non-connected state measurement through a preset rule or algorithm, and then may send the group ID to the corresponding user-side device through broadcasting or signaling such as RRC, MAC CE or PDCCH, etc.

The group ID may be obtained by taking the modulus of the International Mobile Subscriber Identity (IMSI) or resume ID of the user-side device.

S806: acquiring, by the user-side device, the non-connected state measurement configuration information corresponding to the group ID.

In the implementation, different group IDs may correspond to different non-connected measurement configuration information. When the user-side device obtains the group ID to which the user-side device belongs, the corresponding non-connected measurement configuration may be determined by the obtained group ID information.

S808: performing, by the user-side device, the non-connected state measurement according to the non-connected state measurement configuration information, in the case that the non-connected state measurement indication information instructs the user-side device to perform the non-connected state measurement.

For the specific processing of step S808, reference may be made to the related content of step S104, and details are not described herein again.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 8

Figure 9:
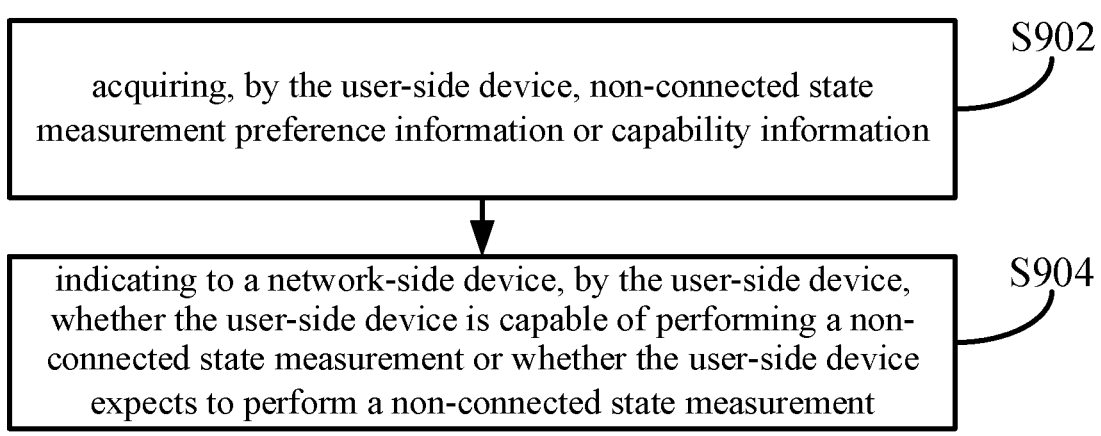
FIG. 9 is another embodiment of a measurement method of a non-connected user-side device according to the present disclosure.

As shown in FIG. 9, a measurement method of a non-connected user-side device is provided in an embodiment of the present disclosure provides. The method can be applied to the measurement of a non-connected user-side device. The measurement of the non-connected user-side device is a measurement that needs to be performed by the user-side device when it is in the non-connected state. The measurement of the non-connected user-side device can be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items can be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S902: acquiring, by the user-side device, non-connected state measurement preference information or capability information.

The non-connected state measurement preference information may be used to indicate whether the user-side device has the ability to or prefers to perform non-connected state measurement, and the capability information may have the ability to perform non-connected state measurement.

In the implementation, the user-side device may acquire its own parameter data related to the non-connected state measurement, and may determine whether the user-side device has the capability to perform the non-connected state measurement based on the parameter data, or an option of whether to perform the non-connected state measurement is set in each user-side device, and the user or related technical personnel may set the above options according to the actual situation, so that the user-side device may obtain the non-connected state measurement preference information or capability information.

S904: indicating to a network-side device, by the user-side device, whether the user-side device is capable of performing a non-connected state measurement or whether the user-side device expects to perform a non-connected state measurement.

If the user-side device indicates to the network-side device that the user-side device is capable of performing non-connected state measurement or expects to perform non-connected state measurement, the user-side device performs non-connected state measurement according to the non-connected state measurement configuration information, and the specific processing may be refer to the relevant content of the above step S104, which will not be repeated here.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 9

Figure 10:
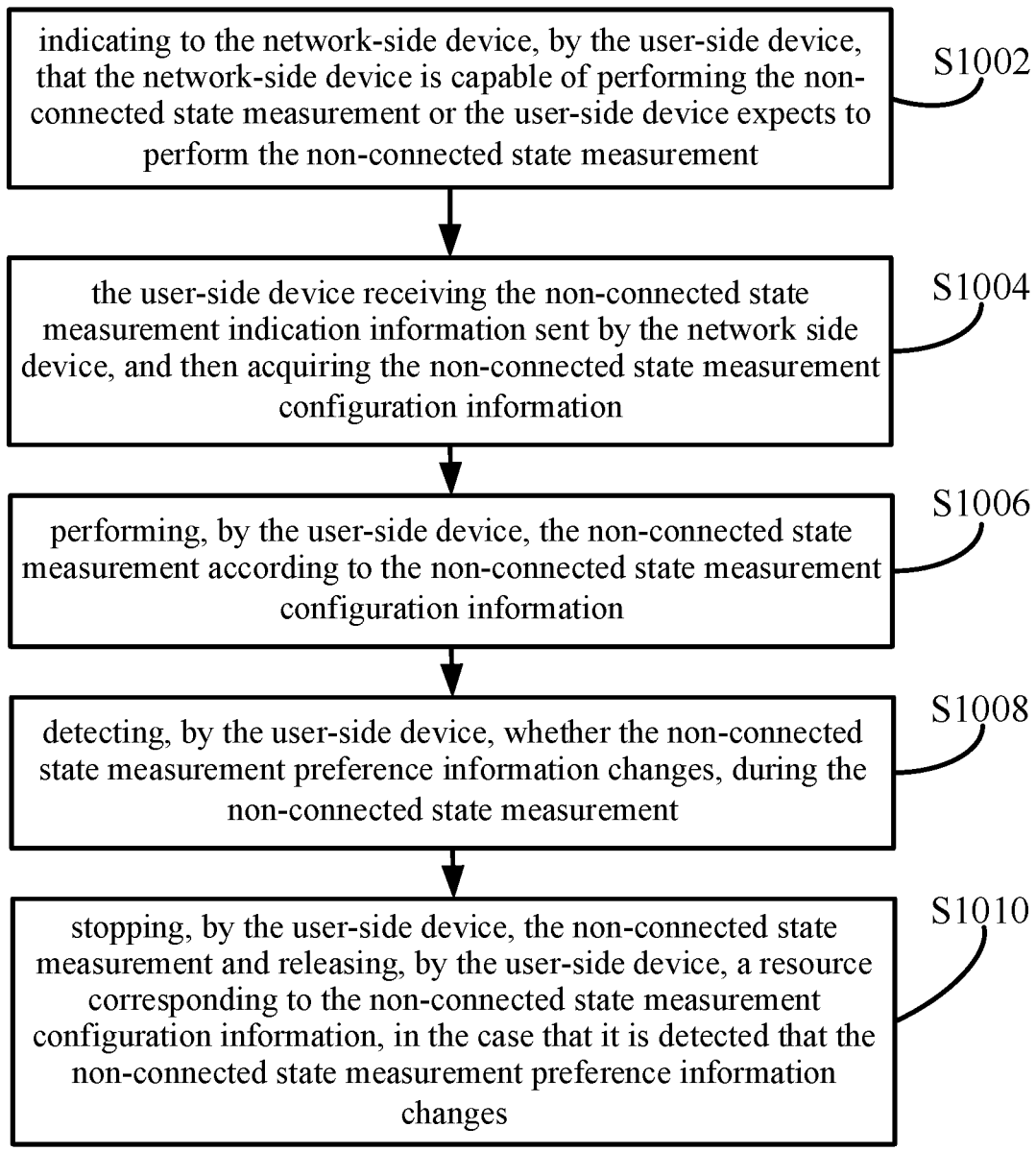
FIG. 10 is another embodiment of a measurement method of a non-connected user-side device of the present disclosure.

As shown in FIG. 10, a measurement method of a non-connected user-side device is provided in an embodiment of the present disclosure provides. The method can be applied to the measurement of a non-connected user-side device. The measurement of the non-connected user-side device is a measurement that needs to be performed by the user-side device when it is in the non-connected state. The measurement of the non-connected user-side device can be set according to different measurement purposes, for example, the purpose of the measurement of the non-connected user-side device is to quickly activate the SCell. Correspondingly, the measurement item can be the measurement of the signal quality of the reference signal at different frequencies (not only the frequency of the current cell, but also the frequencies of other cells, etc.). The purpose of the measurement and the measurement items can be set according to the actual situation, which is not limited in the embodiments of the present disclosure. The execution subject of the method may be a user-side device, where the user-side device may be a terminal device, the terminal device may be a mobile terminal device such as a mobile phone, a tablet computer or a wearable device, and the terminal device may also be a terminal such as a personal computer device. The method may specifically include the following steps:

S1002: indicating to the network-side device, by the user-side device, that the network-side device is capable of performing the non-connected state measurement or the user-side device expects to perform the non-connected state measurement.

In the implementation, the user-side device may acquire its own parameter data related to the non-connected state measurement, and may determine whether the user-side device has the capability to perform the non-connected state measurement based on the parameter data, or an option of whether to perform the non-connected state measurement is set in each user-side device, and the user or related technical personnel may set the above options according to the actual situation. After obtaining the non-connected state measurement preference information, the user-side device may send the non-connected state measurement preference information to the network side device. The network-side device may determine whether it is necessary to send the non-connected state measurement configuration information to the user-side device through the non-connected state measurement preference information.

It should be noted that the process of sending by the user-side device the non-connected state measurement preference information to the network-side device is actively performed by the user-side device, and in practical applications, the network-side device may also trigger the user-side device to perform the above step S1002. The process thereof may specifically include the following: the user-side device receives a reporting request for non-connected state measurement preference information sent by the network side device; the user-side device sends the non-connected state measurement preference information corresponding to the reporting request to the network side device.

S1004: the user-side device receiving the non-connected state measurement indication information sent by the network side device, and then acquiring the non-connected state measurement configuration information.

If the non-connected state measurement indication information instructs the user-side device to perform non-connected state measurement, the non-connected state measurement indication information may carry the non-connected state measurement configuration information, or, if the non-connected state measurement indication information indicates the user-side device to perform the non-connected state measurement, the user-side device may obtain the non-connected state measurement configuration information through other ways, for example, through the above-mentioned RRC, MAC CE, or PDCCH.

S1006: performing, by the user-side device, the non-connected state measurement according to the non-connected state measurement configuration information.

For specific processing of step S1006, reference may be made to the related content of step S104, and details are not described herein again.

S1008: detecting, by the user-side device, whether the non-connected state measurement preference information changes, during the non-connected state measurement.

In implementation, the user-side device may be set with a detection period for detecting the above-mentioned non-connected state measurement preference information, such as 30 seconds or 1 minute. Whenever the detection period is reached, the non-connected state measurement preference information of the user-side device may be obtained, and then the acquired non-connected state measurement preference information may be compared with the non-connected state measurement preference information of the user-side device acquired in the previous detection period. If the two preference information are the same, it is determined that the non-connected state measurement preference information of the user-side device does not change. In this case, the processing of step S1010 described below may not be required. If the two preference information are different, it is determined that the non-connected state measurement preference information of the user-side device has changed. At this time, the process of step S910 described below may be continued.

S1010: stopping, by the user-side device, the non-connected state measurement and releasing, by the user-side device, a resource corresponding to the non-connected state measurement configuration information, in the case that it is detected that the non-connected state measurement preference information changes.

According to the measurement method of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 10

Figure 11:
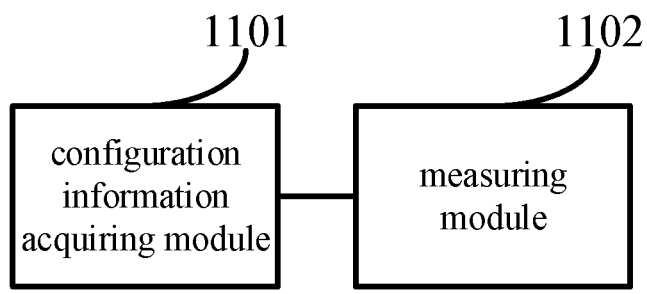
FIG. 11 is an embodiment of a measurement device of a non-connected user-side device of the present disclosure.

The above is the measurement method of the non-connected user-side device provided in the embodiment of the present disclosure. Based on the same idea, a measurement apparatus of the non-connected user-side device is further provided in some embodiments of the present disclosure, as shown in FIG. 11. The apparatus includes: a configuration information acquiring module 1101 and a measuring module 1102.

The configuration information acquiring module 1101 is configured to acquire non-connected state measurement configuration information;

The measuring module 1102 is configured to perform a non-connected state measurement according to the non-connected state measurement configuration information.

In some embodiments of the present disclosure, the apparatus further includes:

a receiving module, configured to receive non-connected state measurement indication information sent by a network-side device, where the non-connected state measurement indication information includes the non-connected state measurement configuration information;

the measuring module 1102 is configured to: determine that the non-connected state measurement indication information instructs the user-side device to perform the non-connected state measurement; perform the non-connected state measurement according to the non-connected state measurement configuration information.

In some embodiments of the present disclosure, the measuring module 1102 is configured to perform the non-connected state measurement according to the non-connected state measurement configuration information, in the case that the non-connected state measurement indication information instructs the user-side device to perform the non-connected state measurement and a duration from a receiving time of the non-connected state measurement indication information to a current time is within a predetermined range.

In some embodiments of the present disclosure, the measuring module 1102 includes:

a duration acquiring unit, configured to acquire a first duration for entering a non-connected state from a connected state, in the case that the non-connected state measurement indication information instructs the user-side device to perform the non-connected state measurement;

a first measuring unit, configured to perform the non-connected state measurement according to the non-connected state measurement configuration information, in the case that the first duration does not exceed a predetermined duration threshold.

In some embodiments of the present disclosure, the measuring module 1102 includes:

a throughput acquiring unit, configured to acquire a data throughput of a last or last N times in the connected state, in the case that the non-connected state measurement indication information instructs the user-side device to perform the non-connected state measurement;

a second measuring unit, configured to perform the non-connected state measurement according to the non-connected state measurement configuration information, in the case that the data throughput of the last or last N times in the connected state exceeds a predetermined throughput threshold, where N is a positive integer larger than 1.

In some embodiments of the present disclosure, the measuring module 1102 includes:

a carrier aggregation configuration acquiring unit, configured to acquire configuration information of a carrier aggregation, or a dual connection (DC), or a bandwidth part (BWP), or a multiple input multiple output (MIMO) of a last time in the connected state, in the case that the non-connected state measurement indication information instructs the user-side device to perform the non-connected state measurement;

a third measuring unit, configured to perform the non-connected state measurement according to the non-connected state measurement configuration information, in the case that the configuration information indicates that carrier aggregation, or the DC, or the BWP, or the MIMO is performed in the last time in the connected state.

In some embodiments of the present disclosure, the measuring module 1102 includes:

a signal quality acquiring unit, configured to acquire a signal quality of a currently camped service cell, in the case that the non-connected state measurement indication information instructs the user-side device to perform the non-connected state measurement;

a fourth measuring unit, configured to perform the non-connected state measurement according to the non-connected state measurement configuration information, in the case that the signal quality of the currently camped service cell exceeds a preset signal quality threshold.

In some embodiments of the present disclosure, the configuration information acquiring module 1101 includes:

a group ID acquiring unit, configured to acquire a group ID to which the user-side device belongs;

a configuration information acquiring unit, configured to acquire the non-connected state measurement configuration information corresponding to the group ID.

In some embodiments of the present disclosure, the group ID acquiring unit is configured to acquire a group ID allocated by the network device for the user-side device.

In some embodiments of the present disclosure, the group ID acquiring unit is configured to acquire the group ID obtained by taking a modulus of an International Mobile Subscriber Identity (IMSI) or a resume ID of the user-side device.

In some embodiments of the present disclosure, the configuration information acquiring module 1101 includes:

an agreement information acquiring unit, configured to acquire preset non-connected state measurement agreement information;

a configuration information generating unit, configured to generate the non-connected state measurement configuration information according to the non-connected state measurement agreement information, in the case that the non-connected state measurement agreement information instructs the user-side device to perform the non-connected state measurement.

According to the measurement apparatus of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 11

Figure 12:
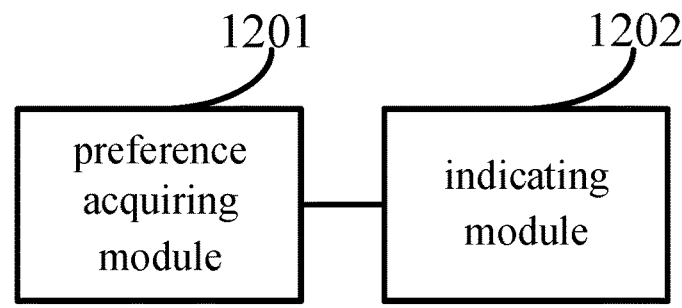
FIG. 12 is another embodiment of a measurement device of a non-connected user-side device of the present disclosure.

The above is the measurement method of the non-connected user-side device provided by the embodiment of the present disclosure. Based on the same idea, a measurement apparatus of the non-connected user-side device is further provided in the embodiment of the present disclosure, as shown in FIG. 12. The dev apparatus includes: a preference acquiring module 1201 and an indicating module 1202.

The preference acquiring module 1201 is configured to acquire non-connected state measurement preference information or capability information.

The indicating module 1202 is configured to indicate to a network-side device whether the user-side device is capable of performing a non-connected state measurement or whether the user-side device expects to perform a non-connected state measurement.

In some embodiments of the present disclosure, the indicating module 1202 is configured to indicate to the network-side device that the network-side device is capable of performing the non-connected state measurement or the user-side device expects to perform the non-connected state measurement.

The apparatus further includes:

an indication information receiving module, configured to receive non-connected state measurement indication information sent by the network-side device, where the non-connected state measurement indication information includes the non-connected state measurement configuration information;

a configuration information acquiring module, configured to determine that the non-connected state measurement indication information instructs the user-side device to perform the non-connected state measurement; and performing the non-connected state measurement according to the non-connected state measurement configuration information.

The apparatus further includes:

a reporting request receiving module, configured to receive a reporting request of the non-connected state measurement preference information or capability information sent by the network device;

a reporting request sending module, configured to send the non-connected state measurement preference information or capability information corresponding to the reporting request to the network-side device.

In some embodiments of the present disclosure, the preference sending module is configured to receive the reporting request of the non-connected state measurement preference information sent by the network device and send the non-connected state measurement preference information corresponding to the reporting request to the network-side device In some embodiments of the present disclosure, the apparatus further includes:

a detecting module, configured to detect whether the non-connected state measurement preference information changes during the non-connected state measurement;

a stopping measurement module, configured to stop the non-connected state measurement and release a resource corresponding to the non-connected state measurement configuration information, in the case that it is detected that the non-connected state measurement preference information changes.

According to the measurement apparatus of the non-connected user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 12

Figure 13:
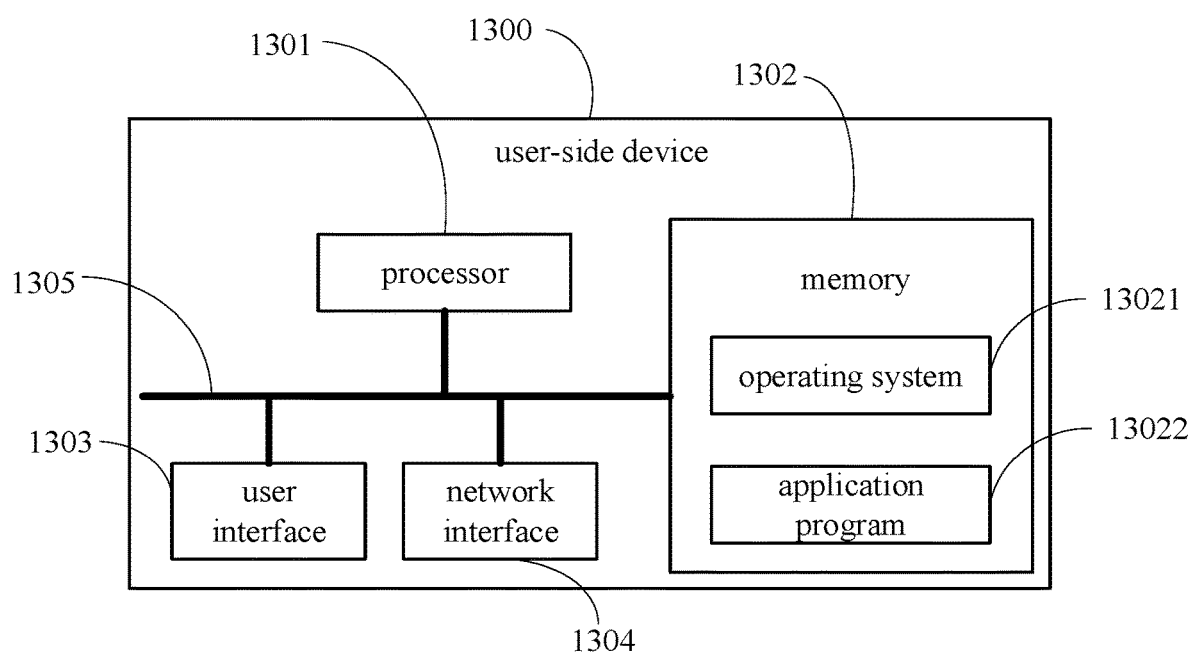
FIG. 13 is an embodiment of a user-side device of the present disclosure.

FIG. 13 is a block diagram of a mobile terminal according to another embodiment of the present disclosure. The mobile terminal 1300 shown in FIG. 13 includes: at least one processor 1301, memory 1302, at least one network interface 1304, and user interface 1303. The various components in the mobile terminal 1300 are coupled together through a bus system 1305. It can be understood that the bus system 1305 is used to implement connection and communication between these components. In addition to the data bus, the bus system 1305 also includes a power bus, a control bus, and a status signal bus. However, for clarity, various buses are marked as the bus system 1305 in FIG. 13.

The user interface 1303 may include a display, a keyboard, or a pointing device (for example, a mouse, a trackball, a touch pad, or a touch screen, etc.).

It can be understood that the memory 1302 in the embodiment of the present disclosure may be a volatile memory or a nonvolatile memory, or may include both volatile and nonvolatile memory. Among them, the non-volatile memory can be read-only memory (ROM), programmable read-only memory (PROM), erasable programmable read-only memory (EPROM), electrically erasable and removable Program read-only memory (Electrically EPROM, EEPROM) or flash memory. The volatile memory may be a random access memory (RAM), which is used as an external cache. By way of example but not limitation, many forms of RAM are available, such as static random access memory (SRAM), dynamic random access memory (DRAM), synchronous dynamic random access memory (SDRAM), Double data rate synchronous dynamic random access memory (DDRSDRAM), enhanced synchronous dynamic random access memory (Enhanced SDRAM, ESDRAM), synchronous connection dynamic random access memory (SLDRAM) and direct memory bus random access Memory (Direct Rambus RAM, DRRAM). The memory 1302 of the system and method described in the embodiments of the present disclosure is intended to include, but is not limited to, these and any other suitable types of memory.

In some embodiments, the memory 1302 stores the following elements, executable modules or data structures, or their subsets, or their extended sets: operating system 13021 and application programs 13022.

Among them, the operating system 13021 includes various system programs, such as a framework layer, a core library layer, a driver layer, etc., for implementing various basic services and processing hardware-based tasks. The application program 13022 includes various application programs, such as a media player, a browser, etc., for implementing various application services. The program for implementing the method of the embodiment of the present disclosure may be included in the application program 13022.

In the embodiment of the present disclosure, the mobile terminal 1300 further includes: a computer program stored on the memory 1309 and executable on the processor 1310. When the computer program is executed by the processor 1301, the following steps are implemented: acquiring non-connected state measurement configuration information; performing a non-connected state measurement according to the non-connected state measurement configuration information.

The method disclosed in the foregoing embodiment of the present disclosure may be applied to the processor 1301 or implemented by the processor 1301. The processor 1301 may be an integrated circuit chip with signal processing capabilities. In the implementation process, each step of the above method may be completed by an integrated logic circuit of hardware in the processor 1301 or an instruction in the form of software. The aforementioned processor 1301 may be a general-purpose processor, a digital signal processor (DSP), an application specific integrated circuit (ASIC), an existing programmable gate array (FPGA) or other programmable logic devices, discrete gates or transistor logic devices, discrete hardware components. The disclosed methods, steps, and logical block diagrams in the embodiments of the present disclosure may be implemented or executed. The general-purpose processor may be a microprocessor or the processor may be any conventional processor or the like. The steps of the method disclosed in conjunction with the embodiments of the present disclosure may be directly embodied and executed by a hardware decoding processor, or may be executed and completed by a combination of hardware and software modules in the decoding processor. The software module may be located in a computer-readable storage medium that is mature in the art, such as random access memory, flash memory, read-only memory, programmable read-only memory, or electrically erasable programmable memory, and registers. The computer-readable storage medium is located in the memory 1302, and the processor 1301 reads the information in the memory 1302 and completes the steps of the above method in combination with its hardware. Specifically, a computer program is stored on the computer-readable storage medium, and when the computer program is executed by the processor 1301, each step of the embodiment of the measurement method of the non-connected user-side device described above is implemented.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASIC), digital signal processor (DSP), digital signal processing device (DSPD), programmable logic device (PLD), Field programmable gate array (FPGA), general-purpose processor, controller, microcontroller, microprocessor, other electronic units for performing the functions described in the present disclosure, or a combination thereof.

For software implementation, the technology described in the embodiments of the present disclosure may be implemented through modules (e.g., processes, functions, etc.) that perform the functions described in the embodiments of the present disclosure. The software codes can be stored in the memory and executed by the processor. The memory may be implemented in the processor or external to the processor.

Optionally, when the computer program is executed by the processor 1301 to perform:

prior to the acquiring, by the user-side device, the non-connected state measurement configuration information, the method further includes:

receiving non-connected state measurement indication information sent by a network-side device, where the non-connected state measurement indication information includes the non-connected state measurement configuration information;

where the performing by the user-side device the non-connected state measurement according to the non-connected state measurement configuration information includes:

determining that the non-connected state measurement indication information instructs the user-side device to perform the non-connected state measurement;

performing the non-connected state measurement according to the non-connected state measurement configuration information.

Optionally, the performing the non-connected state measurement according to the non-connected state measurement configuration information in the case that the non-connected state measurement indication information instructs the user-side device to perform the non-connected state measurement includes:

performing the non-connected state measurement according to the non-connected state measurement configuration information, in the case that the non-connected state measurement indication information instructs the user-side device to perform the non-connected state measurement and a duration from a receiving time of the non-connected state measurement indication information to a current time is within a predetermined range.

Optionally, the performing the non-connected state measurement according to the non-connected state measurement configuration information includes:

acquiring a first duration for entering a non-connected state from a connected state, in the case that the non-connected state measurement indication information instructs the user-side device to perform the non-connected state measurement;

performing the non-connected state measurement according to the non-connected state measurement configuration information, in the case that the first duration does not exceed a predetermined duration threshold.

Optionally, the performing the non-connected state measurement according to the non-connected state measurement configuration information includes:

acquiring a data throughput of a last or last N times in the connected state, in the case that the non-connected state measurement indication information instructs the user-side device to perform the non-connected state measurement;

performing the non-connected state measurement according to the non-connected state measurement configuration information, in the case that the data throughput of the last or last N times in the connected state exceeds a predetermined throughput threshold, where N is a positive integer larger than 1.

Optionally, the performing the non-connected state measurement according to the non-connected state measurement configuration information includes:

acquiring configuration information of a carrier aggregation, or a dual connection (DC), or a bandwidth part (BWP), or a multiple input multiple output (MIMO) of a last time in the connected state, in the case that the non-connected state measurement indication information instructs the user-side device to perform the non-connected state measurement;

performing, by the user-side device, the non-connected state measurement according to the non-connected state measurement configuration information, in the case that the configuration information indicates that carrier aggregation, or the DC, or the BWP, or the MIMO is performed in the last time in the connected state.

Optionally, the performing the non-connected state measurement according to the non-connected state measurement configuration information includes:

acquiring a signal quality of a currently camped service cell, in the case that the non-connected state measurement indication information instructs the user-side device to perform the non-connected state measurement;

performing the non-connected state measurement according to the non-connected state measurement configuration information, in the case that the signal quality of the currently camped service cell exceeds a preset signal quality threshold.

Optionally, the acquiring the non-connected state measurement configuration information includes:

acquiring a group ID to which the user-side device belongs;

acquiring the non-connected state measurement configuration information corresponding to the group ID.

Optionally, the group ID is allocated by a network side device; or the group ID is obtained by taking a modulus of an International Mobile Subscriber Identity (IMSI) or a resume ID of the user-side device.

Optionally, the acquiring by the user-side device the non-connected state measurement configuration information includes:

acquiring preset non-connected state measurement agreement information;

generating the non-connected state measurement configuration information according to the non-connected state measurement agreement information, in the case that the non-connected state measurement agreement information instructs the user-side device to perform the non-connected state measurement.

Optionally, the computer program is executed by the processor 1301 to perform:

acquiring non-connected state measurement preference information or capability information;

indicating to a network-side device whether the user-side device is capable of performing a non-connected state measurement or whether the user-side device expects to perform a non-connected state measurement.

Optionally, the method further includes:

indicating to the network-side device that the network-side device is capable of performing the non-connected state measurement or the user-side device expects to perform the non-connected state measurement;

receiving non-connected state measurement indication information sent by the network-side device, where the non-connected state measurement indication information includes the non-connected state measurement configuration information;

determining that the non-connected state measurement indication information instructs the user-side device to perform the non-connected state measurement; and performing the non-connected state measurement according to the non-connected state measurement configuration information.

Optionally, the sending the non-connected state measurement preference information or capability information to the network side device includes:

receiving a reporting request of the non-connected state measurement preference information or capability information sent by the network device;

sending the non-connected state measurement preference information or capability information corresponding to the reporting request to the network-side device.

Optionally, the method further includes:

detecting whether the non-connected state measurement preference information changes, during the non-connected state measurement;

stopping the non-connected state measurement and releasing a resource corresponding to the non-connected state measurement configuration information, in the case that it is detected that the non-connected state measurement preference information changes.

The mobile terminal 1300 can implement various processes implemented by the mobile terminal in the foregoing embodiments. To avoid repetition, details are not described here.

According to the user-side device in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

Embodiment 13

The above is the user-side device provided by the embodiment of the present disclosure. Based on the same idea, the embodiment of the present disclosure also provides a computer-readable storage medium.

The computer-readable storage medium stores one or more programs, and when the one or more programs is executed by a user-side device including a plurality of application programs according to the processing procedure shown in FIG. 1, the user-side device performs:

prior to the acquiring, by the user-side device, the non-connected state measurement configuration information, the method further includes:

receiving non-connected state measurement indication information sent by a network-side device, where the non-connected state measurement indication information includes the non-connected state measurement configuration information;

where the performing by the user-side device the non-connected state measurement according to the non-connected state measurement configuration information includes:

determining that the non-connected state measurement indication information instructs the user-side device to perform the non-connected state measurement;

performing the non-connected state measurement according to the non-connected state measurement configuration information.

Optionally, the performing the non-connected state measurement according to the non-connected state measurement configuration information in the case that the non-connected state measurement indication information instructs the user-side device to perform the non-connected state measurement includes:

performing the non-connected state measurement according to the non-connected state measurement configuration information, in the case that the non-connected state measurement indication information instructs the user-side device to perform the non-connected state measurement and a duration from a receiving time of the non-connected state measurement indication information to a current time is within a predetermined range.

Optionally, the performing the non-connected state measurement according to the non-connected state measurement configuration information includes:

acquiring a first duration for entering a non-connected state from a connected state, in the case that the non-connected state measurement indication information instructs the user-side device to perform the non-connected state measurement;

performing the non-connected state measurement according to the non-connected state measurement configuration information, in the case that the first duration does not exceed a predetermined duration threshold.

Optionally, the performing the non-connected state measurement according to the non-connected state measurement configuration information includes:

acquiring a data throughput of a last or last N times in the connected state, in the case that the non-connected state measurement indication information instructs the user-side device to perform the non-connected state measurement;

performing the non-connected state measurement according to the non-connected state measurement configuration information, in the case that the data throughput of the last or last N times in the connected state exceeds a predetermined throughput threshold, where N is a positive integer larger than 1.

Optionally, the performing the non-connected state measurement according to the non-connected state measurement configuration information includes:

acquiring configuration information of a carrier aggregation, or a dual connection (DC), or a bandwidth part (BWP), or a multiple input multiple output (MIMO) of a last time in the connected state, in the case that the non-connected state measurement indication information instructs the user-side device to perform the non-connected state measurement;

performing, by the user-side device, the non-connected state measurement according to the non-connected state measurement configuration information, in the case that the configuration information indicates that carrier aggregation, or the DC, or the BWP, or the MIMO is performed in the last time in the connected state.

Optionally, the performing the non-connected state measurement according to the non-connected state measurement configuration information includes:

acquiring a signal quality of a currently camped service cell, in the case that the non-connected state measurement indication information instructs the user-side device to perform the non-connected state measurement;

performing the non-connected state measurement according to the non-connected state measurement configuration information, in the case that the signal quality of the currently camped service cell exceeds a preset signal quality threshold.

Optionally, the acquiring the non-connected state measurement configuration information includes:

acquiring a group ID to which the user-side device belongs;

acquiring the non-connected state measurement configuration information corresponding to the group ID.

Optionally, the group ID is allocated by a network side device; or the group ID is obtained by taking a modulus of an International Mobile Subscriber Identity (IMSI) or a resume ID of the user-side device.

Optionally, the acquiring by the user-side device the non-connected state measurement configuration information includes:

acquiring preset non-connected state measurement agreement information;

generating the non-connected state measurement configuration information according to the non-connected state measurement agreement information, in the case that the non-connected state measurement agreement information instructs the user-side device to perform the non-connected state measurement.

The computer-readable storage medium stores one or more programs, and when the one or more programs is executed by a user-side device including a plurality of application programs according to the processing procedure shown in FIG. 1, the user-side device performs:

acquiring non-connected state measurement preference information or capability information;

indicating to a network-side device whether the user-side device is capable of performing a non-connected state measurement or whether the user-side device expects to perform a non-connected state measurement.

Optionally, the method further includes:

indicating to the network-side device that the network-side device is capable of performing the non-connected state measurement or the user-side device expects to perform the non-connected state measurement;

receiving non-connected state measurement indication information sent by the network-side device, where the non-connected state measurement indication information includes the non-connected state measurement configuration information;

determining that the non-connected state measurement indication information instructs the user-side device to perform the non-connected state measurement; and performing the non-connected state measurement according to the non-connected state measurement configuration information.

Optionally, the sending the non-connected state measurement preference information or capability information to the network side device includes:

receiving a reporting request of the non-connected state measurement preference information or capability information sent by the network device;

sending the non-connected state measurement preference information or capability information corresponding to the reporting request to the network-side device.

Optionally, the method further includes:

detecting whether the non-connected state measurement preference information changes, during the non-connected state measurement;

stopping the non-connected state measurement and releasing a resource corresponding to the non-connected state measurement configuration information, in the case that it is detected that the non-connected state measurement preference information changes.

According to the computer-readable storage medium in the embodiments of the present disclosure, the non-connected state measurement is performed based on the non-connected state measurement configuration information. Therefore, based on the non-connected state measurement configuration information, the user-side device may help the network-side device to select a suitable user-side device to perform the non-connected state measurement, thereby achieving the measurement of the non-connected state user-side device. In addition, the non-connected state measurement configuration information may include inter-frequency measurement configuration information, thereby achieving an inter-frequency measurement and saving resources of the user-side device during the measurement.

In the 1990s, the improvement of a technology can be clearly distinguished from the improvement of hardware (for example, the improvement of the circuit structure of diodes, transistors, switches, etc.) or the improvement of software (the improvement of the process flow). However, with the development of technology, the improvement of many methods and processes can be regarded as a direct improvement of the hardware circuit structure. Designers almost get the corresponding hardware circuit structure by programming the improved method flow into the hardware circuit. Therefore, it cannot be said that the improvement of a method flow cannot be realized by hardware physical modules. For example, a programmable logic device (PLD) (such as a field programmable gate array (FPGA)) is such an integrated circuit whose logic function is determined by the user programming the device. Designers can program themselves to "integrate" a digital system on a PLD without having to ask chip manufacturers to design and make dedicated integrated circuit chips. Moreover, nowadays, instead of manually making integrated circuit chips, this kind of programming is also mostly implemented with "logic compiler" software, which is similar to the software compiler used in program development and writing, but before compilation The original code of the code must also be written in a specific programming language, which is called the hardware description language (HDL), and HDL is not only one, but there are many, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., the most commonly used at present is Very-High-Speed Integrated Circuit Hardware Description Language (VHDL) and Verilog. Those skilled in the art should also understand that it is easy to obtain the hardware circuit that implements the logic method flow by only slightly programming the method flow in the above hardware description languages and programming it into the integrated circuit.

The controller may be implemented in any suitable manner, for example, the controller may take the form of a microprocessor or processor and a computer-readable medium storing computer-readable program code (such as software or firmware) executable by the (micro) processor, Logic gates, switches, application specific integrated circuits (ASICs), programmable logic controllers and embedded microcontrollers. Examples of controllers include but are not limited to the following microcontrollers: ARC 625D, Atmel AT91SAM, Microchip PIC18F26K20 and Silicone Labs C8051F320, the memory controller can also be implemented as part of the control logic of the memory. Those skilled in the art also know that, in addition to implementing the controller in a pure computer-readable program code manner, it is entirely possible to make the controller into logic gates, switches, application specific integrated circuits, programmable logic controllers and The same function is realized in the form of a microcontroller or the like. Therefore, such a controller can be regarded as a hardware component, and the devices included therein for realizing various functions can also be regarded as a structure within the hardware component. Or even, the device for realizing various functions can be regarded as both a software module of an implementation method and a structure within a hardware component.

The system, device, module or unit explained in the above embodiments may be specifically implemented by a computer chip or entity, or by a product having a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination of these devices.

For the convenience of description, when describing the above device, the functions are divided into various units and described separately. Of course, when implementing the present disclosure, the functions of each unit may be implemented in one or more software and/or hardware.

Those skilled in the art should understand that the embodiments of the present disclosure may be provided as methods, systems, or computer program products. Therefore, the present disclosure may take the form of an entirely hardware embodiment, an entirely software embodiment, or an embodiment combining software and hardware. Moreover, the present disclosure may take the form of a computer program product implemented on one or more computer usable storage media (including but not limited to disk storage, CD-ROM, optical storage, etc.) containing computer usable program code.

The present disclosure is described with reference to flowcharts and/or block diagrams of methods, devices (systems), and computer program products according to embodiments of the application. It should be understood that each flow and/or block in the flowchart and/or block diagram and a combination of the flow and/or block in the flowchart and/or block diagram may be implemented by computer program instructions. These computer program instructions can be provided to the processor of a general-purpose computer, special-purpose computer, embedded processing machine, or other programmable data processing device to produce a machine that enables the generation of instructions executed by the processor of the computer or other programmable data processing device A device for realizing the functions specified in one block or multiple blocks of one flow or multiple blocks of a flowchart.

These computer program instructions may also be stored in a computer readable memory that can guide a computer or other programmable data processing device to work in a specific manner, so that the instructions stored in the computer readable memory produce an article of manufacture including an instruction device, the instructions The device implements the functions specified in one block or multiple blocks of the flowchart one flow or multiple flows and/or block diagrams.

These computer program instructions can also be loaded onto a computer or other programmable data processing device, so that a series of operating steps are performed on the computer or other programmable device to produce computer-implemented processing, which is executed on the computer or other programmable device The instructions provide steps for implementing the functions specified in one block or multiple blocks of the flowchart one flow or multiple flows and/or block diagrams.

In a typical configuration, the computing device includes one or more processors (CPUs), input/output interfaces, network interfaces, and memory.

The memory may include non-permanent memory, random access memory (RAM) and/or non-volatile memory in a computer-readable medium, such as read only memory (ROM) or flash memory (flash RAM). Memory is an example of computer-readable media.

Computer-readable media, including permanent and non-permanent, removable and non-removable media, can store information by any method or technology. The information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, Magnetic tape cassettes, magnetic tape magnetic disk storage or other magnetic storage devices or any other non-transmission media can be used to store information that can be accessed by computing devices. As defined herein, computer-readable media does not include temporary computer-readable media (transitory media), such as modulated data signals and carrier waves.

It should also be noted that the terms "include", "including" or any other variant thereof are intended to cover non-exclusive inclusion, so that a process, method, commodity or device that includes a series of elements not only includes those elements, but also includes other elements not explicitly listed, or include elements inherent to such processes, methods, goods, or equipment. Without more restrictions, the element defined by the sentence "include one . . . " does not exclude that there are other identical elements in the process, method, commodity, or equipment that includes the element.

Those skilled in the art should understand that the embodiments of the present disclosure may be provided as methods, systems, or computer program products. Therefore, the present disclosure may take the form of an entirely hardware embodiment, an entirely software embodiment, or an embodiment combining software and hardware. Moreover, the present disclosure may take the form of a computer program product implemented on one or more computer usable storage media (including but not limited to disk storage, CD-ROM, optical storage, etc.) containing computer usable program code.

The present disclosure can be described in the general context of computer-executable instructions executed by a computer, such as program modules. Generally, program modules include routines, programs, objects, components, data structures, etc. that perform specific tasks or implement specific abstract data types. The present disclosure can also be practiced in distributed computing environments in which remote processing devices connected through a communication network perform tasks. In a distributed computing environment, program modules may be located in local and remote computer storage media including storage devices.

The embodiments in this specification are described in a progressive manner. The same or similar parts between the embodiments can be referred to each other, and each embodiment focuses on the differences from other embodiments. In particular, for the system embodiment, since it is basically similar to the method embodiment, the description is relatively simple, and the relevant part can be referred to the description of the method embodiment.

The above are only some embodiments of the present disclosure, and is not intended to limit the present disclosure. For those skilled in the art, the present disclosure may have various modifications and changes. Any modification, equivalent replacement, improvement, etc. made within the principle of the present disclosure shall be included in the scope of the claims of the present disclosure.

What is claimed is:

1. A measurement method of a non-connected state user-side device, comprising:
  acquiring, by the user-side device, non-connected state measurement configuration information;

performing, by the user-side device, a non-connected state measurement according to the non-connected state measurement configuration information;

wherein prior to the acquiring, by the user-side device, the non-connected state measurement configuration information, the method further comprises:

receiving, by the user-side device, non-connected state measurement indication information sent by a network-side device;

wherein the performing by the user-side device the non-connected state measurement according to the non-connected state measurement configuration information comprises:

determining, by the user-side device, that the non-connected state measurement indication information instructs the user-side device to perform the non-connected state measurement;

performing, by the user-side device, the non-connected state measurement according to the non-connected state measurement configuration information.

2. The method according to claim 1, wherein the performing by the user-side device the non-connected state measurement according to the non-connected state measurement configuration information in the ease that the non-connected state measurement indication information instructs the user-side device to perform the non-connected state measurement comprises:

performing, by the user-side device, the non-connected state measurement according to the non-connected state measurement configuration information, in the case that the non-connected state measurement indication information instructs the user-side device to perform the non-connected state measurement and a duration from a receiving time of the non-connected state measurement indication information to a current time is within a predetermined range.

3. The method according to claim 1, wherein the performing by the user-side device the non-connected state measurement according to the non-connected state measurement configuration information comprises:

acquiring, by the user-side device, a first duration for entering a non-connected state from a connected state, in the case that the non-connected state measurement indication information instructs the user-side device to perform the non-connected state measurement;

performing, by the user-side device, the non-connected state measurement according to the non-connected state measurement configuration information, in the case that the first duration does not exceed a predetermined duration threshold.

4. The method according to claim 1, wherein the performing by the user-side device the non-connected state measurement according to the non-connected state measurement configuration information comprises:

acquiring, by the user-side device, a data throughput of a last or last N times in the connected state, in the case that the non-connected state measurement indication information instructs the user-side device to perform the non-connected state measurement;

performing, by the user-side device, the non-connected state measurement according to the non-connected state measurement configuration information, in the case that the data throughput of the last or last N times in the connected state exceeds a predetermined throughput threshold, wherein N is a positive integer larger than 1.

5. The method according to claim 1, wherein the performing by the user-side device the non-connected state measurement according to the non-connected state measurement configuration information comprises:

acquiring, by the user-side device, configuration information of a carrier aggregation, or a dual connection (DC), or a bandwidth part (BWP), or a multiple input multiple output (MIMO) of a last time in the connected state, in the case that the non-connected state measurement indication information instructs the user-side device to perform the non-connected state measurement;

performing, by the user-side device, the non-connected state measurement according to the non-connected state measurement configuration information, in the case that the configuration information indicates that carrier aggregation, or the DC, or the BWP, or the MIMO is performed in the last time in the connected state.

6. The method according to claim 1, wherein the performing by the user-side device the non-connected state measurement according to the non-connected state measurement configuration information comprises:

acquiring, by the user-side device, a signal quality of a currently camped service cell, in the case that the non-connected state measurement indication information instructs the user-side device to perform the non-connected state measurement;

performing, by the user-side device, the non-connected state measurement according to the non-connected state measurement configuration information, in the case that the signal quality of the currently camped service cell exceeds a preset signal quality threshold.

7. The method according to claim 1, wherein the acquiring by the user-side device the non-connected state measurement configuration information comprises:

acquiring, by the user-side device, a group ID to which the user-side device belongs;

acquiring, by the user-side device, the non-connected state measurement configuration information corresponding to the group ID;

wherein the group ID is allocated by a network side device; or the group ID is obtained by taking a modulus of an International Mobile Subscriber Identity (IMSI) or a resume ID of the user-side device.

8. The method according to claim 1, wherein the acquiring by the user-side device the non-connected state measurement configuration information comprises:

acquiring, by the user-side device, preset non-connected state measurement agreement information;

generating, by the user-side device, the non-connected state measurement configuration information according to the non-connected state measurement agreement information, in the case that the non-connected state measurement agreement information instructs the user-side device to perform the non-connected state measurement.

9. A measurement method of a non-connected state user-side device, comprising:

acquiring, by the user-side device, non-connected state measurement preference information or capability information;

indicating to a network-side device, by the user-side device, whether the user-side device is capable of performing a non-connected state measurement or whether the user-side device expects to perform a non-connected state measurement;

wherein the method further comprises:

indicating to the network-side device, by the user-side device, that the network-side device is capable of performing the non-connected state measurement or the user-side device expects to perform the non-connected state measurement;

receiving, by the user-side device, non-connected state measurement indication information sent by the network-side device;

acquiring, by the user-side device, non-connected state measurement configuration information after receiving the non-connected state measurement indication information;

determining, by the user-side device, that the non-connected state measurement indication information instructs the user-side device to perform the non-connected state measurement; and performing, by the user-side device, the non-connected state measurement according to the non-connected state measurement configuration information.

10. The method according to claim 9, wherein the sending by user-side device the non-connected state measurement preference information or capability information to the network side device comprises:

receiving, by the user-side device, a reporting request of the non-connected state measurement preference information or capability information sent by the network device;

sending, by the user-side device, the non-connected state measurement preference information or capability information corresponding to the reporting request to the network-side device;

wherein the method further comprises:

detecting, by the user-side device, whether the non-connected state measurement preference information changes, during the non-connected state measurement;

stopping, by the user-side device, the non-connected state measurement and releasing, by the user-side device, a resource corresponding to the non-connected state measurement configuration information, in the case that it is detected that the non-connected state measurement preference information changes.

11. A measurement apparatus of a non-connected state user-side device, comprising: a memory, a processor and a computer program stored in the memory and executable on the processor, and the computer program is executed by the processor to:

acquire non-connected state measurement configuration information;

perform a non-connected state measurement according to the non-connected state measurement configuration information;

wherein the computer program is executed by the processor to:

prior to the acquiring the non-connected state measurement configuration information, receive non-connected state measurement indication information sent by a network-side device;

determine that the non-connected state measurement indication information instructs the user-side device to perform the non-connected state measurement;

perform the non-connected state measurement according to the non-connected state measurement configuration information.

12. The apparatus according to claim 11, wherein the computer program is executed by the processor to perform the non-connected state measurement according to the non-connected state measurement configuration information, in the case that the non-connected state measurement indication information instructs the user-side device to perform the non-connected state measurement and a duration from a receiving time of the non-connected state measurement indication information to a current time is within a predetermined range.

13. The apparatus according to claim 11, wherein the computer program is executed by the processor to:

acquire a first duration for entering a non-connected state from a connected state, in the case that the non-connected state measurement indication information instructs the user-side device to perform the non-connected state measurement;

perform the non-connected state measurement according to the non-connected state measurement configuration information, in the case that the first duration does not exceed a predetermined duration threshold.

14. The apparatus according to claim 11, wherein the computer program is executed by the processor to:

acquire a data throughput of a last or last N times in the connected state, in the case that the non-connected state measurement indication information instructs the user-side device to perform the non-connected state measurement;

perform the non-connected state measurement according to the non-connected state measurement configuration information, in the case that the data throughput of the last or last N times in the connected state exceeds a predetermined throughput threshold, wherein N is a positive integer larger than 1.

15. The apparatus according to claim 11, wherein the computer program is executed by the processor to:

acquire configuration information of a carrier aggregation, or a dual connection (DC), or a bandwidth part (BWP), or a multiple input multiple output (MIMO) of a last time in the connected state, in the case that the non-connected state measurement indication information instructs the user-side device to perform the non-connected state measurement;

perform the non-connected state measurement according to the non-connected state measurement configuration information, in the case that the configuration information indicates that carrier aggregation, or the DC, or the BWP, or the MIMO is performed in the last time in the connected state.

16. The apparatus according to claim 11, wherein the computer program is executed by the processor to:

acquire a signal quality of a currently camped service cell, in the case that the non-connected state measurement indication information instructs the user-side device to perform the non-connected state measurement;

perform the non-connected state measurement according to the non-connected state measurement configuration information, in the case that the signal quality of the currently camped service cell exceeds a preset signal quality threshold.

17. A measurement apparatus of a non-connected state user-side device, comprising: a memory, a processor and a computer program stored in the memory and executable on the processor, and the computer program is executed by the processor to perform the measurement method according to claim 9.

* * * * *